Sept. 22, 1959    A. G. CARTER    2,904,866
SAFETY-BELT BUCKLE
Filed May 26, 1955    2 Sheets-Sheet 1
Fig. 1.
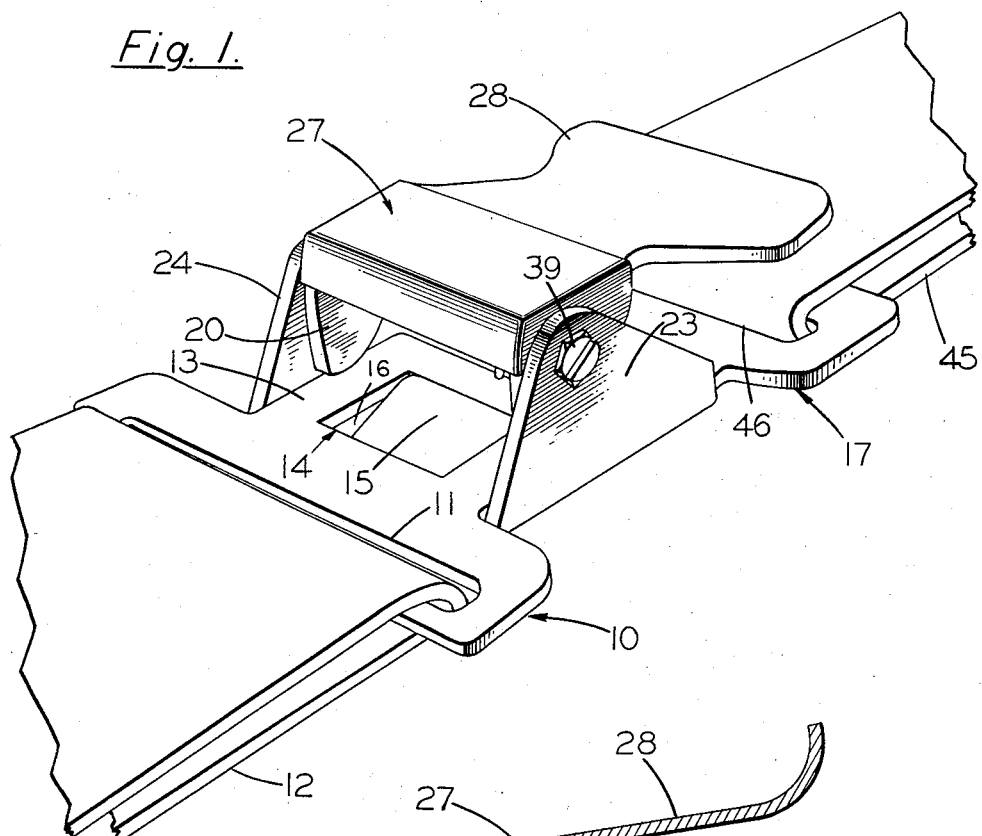
Fig. 6.
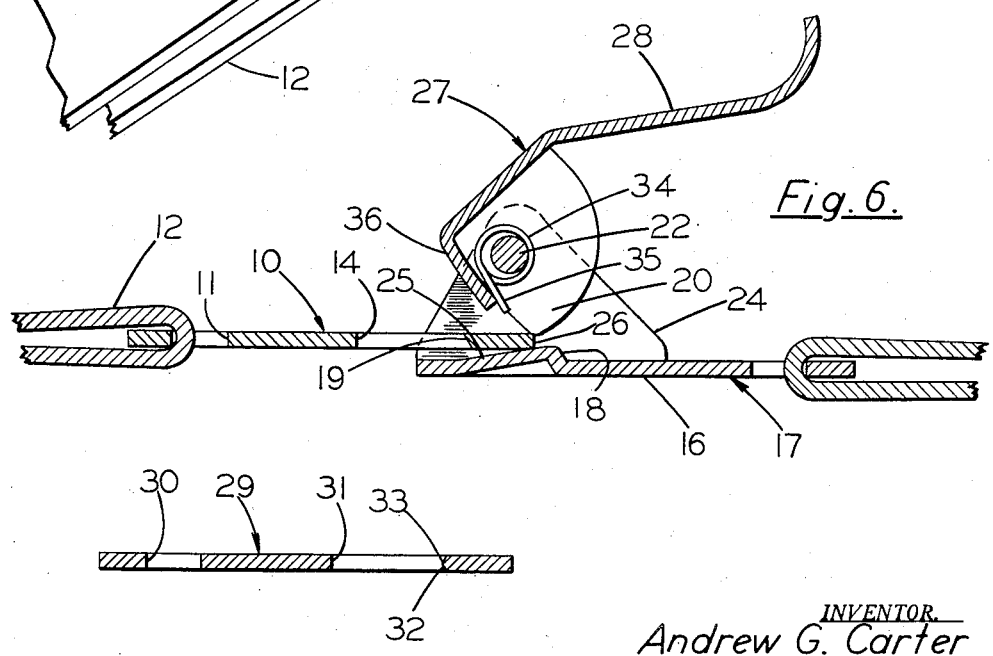
Fig. 7.
INVENTOR.
Andrew G. Carter
—BY—
Attorney Sept. 22, 1959
A. G. CARTER
2,904,866
SAFETY-BELT BUCKLE
Filed May 26, 1955
2 Sheets-Sheet 2
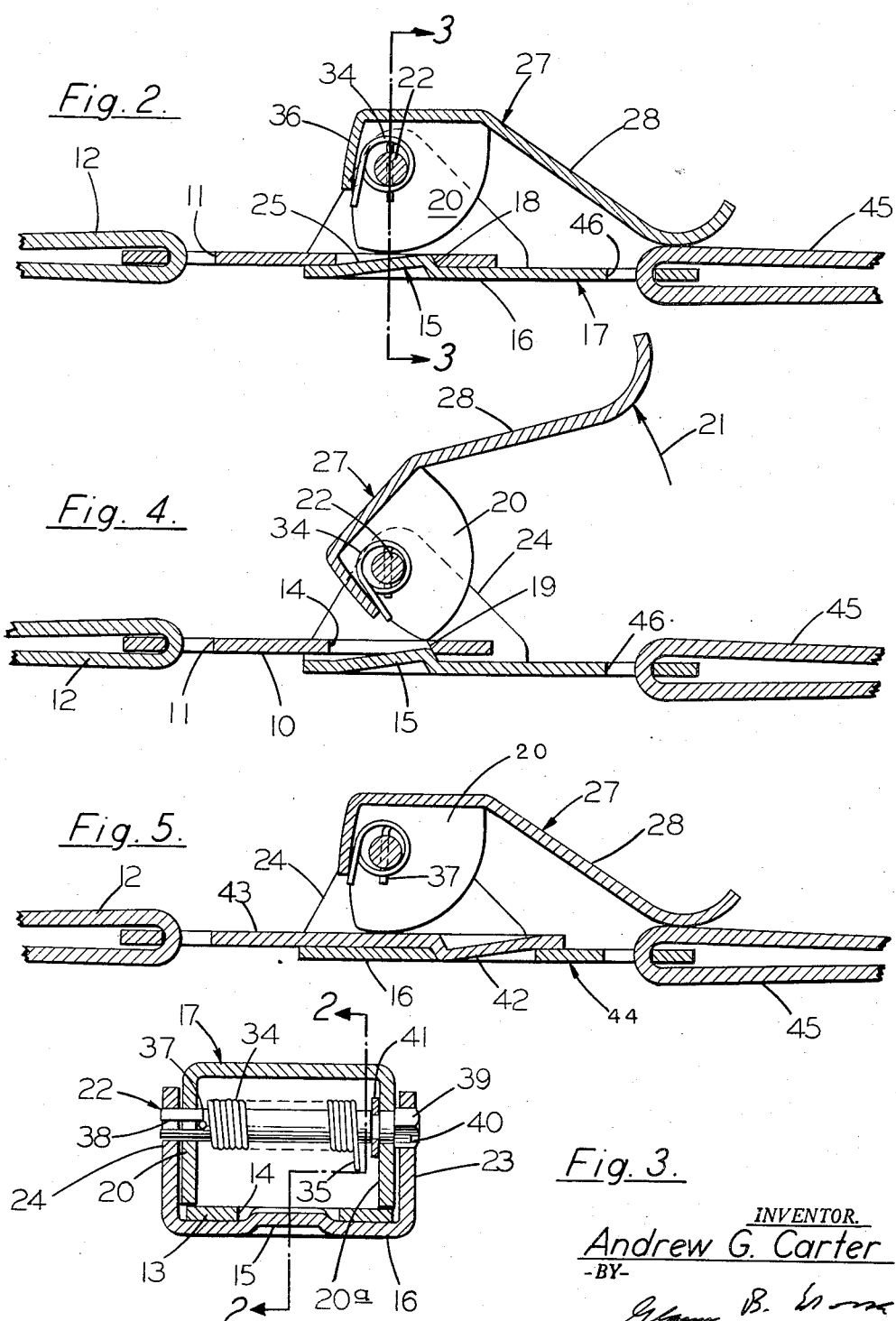
INVENTOR.
Andrew G. Carter
-BY-
Attorney US United States Patent Office 2,904,866
Patented Sept. 22, 1959

2,904,866

SAFETY-BELT BUCKLE

Andrew G. Carter, Grand Rapids, Mich., assignor to Andrew G. Carter and Harriett T. Carter, doing business as Carter Engineering Company, Grand Rapids, Mich.

Application May 26, 1955, Serial No. 511,388

2 Claims. (Cl. 24—170)

This invention relates to the construction of buckles for safety belts. These articles are used with various types of vehicles to limit or retard the forward movement of a passenger in the event of a sudden stop, and to prevent the accidental lateral discharge of the passenger from a door or window. Research conducted on the effects of accidents has established that the energy of forward movement of a passenger should be dissipated in some other fashion than through the engagement of the passenger with solid portions of the vehicle, if the safety of the passenger is to be maintained. It has been found that the use of safety-belts vastly reduces the incidence of fatal injuries, and also reduces the severity of non-fatal injuries. The tremendous gain in safety is gradually becoming recognized by the public as more than offsetting the inconvenience involved in the use of the equipment.

This invention is intended primarily for use in privately-operated passenger vehicles, and this factor establishes several design criteria beyond that of the requisite ability to withstand the loading involved. Simplicity of coupling and uncoupling must be combined with a positive action that requires neither skill nor particular attention on the part of the user. The possibility of accidental release of the buckle must be at an absolute minimum; and yet the buckle must disengage directly under extremely adverse conditions to permit the extrication of an injured or dazed passenger from a crashed vehicle. The possibility of fire occurring after a crash, and the necessity of administering first aid or more advanced treatment, both increase the importance of the ready removability of immobilized passengers.

These basic considerations have determined the characteristics of this invention, and have resulted in several structural details which established a very effective and valuable performance. In appearance, a device embodying this invention superficially resembles a conventional cam-action safety-belt buckle familiar to the airline passenger. The first point of distinction which appears under closer observation is the fact that the conventional cam-action buckle creates a jamming action against the material of the belt itself which becomes more and more tight as tension on the belt increases. It is the usual practice to serrate in a transverse direction the cam of the buckle, and the heavy engagement of this portion of the buckle with the material of the belt creates a very troublesome wear problem as well as distorting the fibers of the belt under tension to the point that the failure of the belt practically always takes place at the area under the influence of the cam. Since a given belt strength is required, this situation results in the necessity of providing a very considerable amount of extra belt strength in order to meet the load requirements at the weakest point. In this invention, there is no jamming action involved, nor is any locking pressure applied to the material of the belt itself. The coupling and uncoupling of the buckle components of this invention involve preferably metallic and wear-resistant surfaces. An additional result of this construction is the fact that it is not necessary to feed a considerable length of belt through the buckle to the point of desired adjustment. In the case of the conventional cam-action arrangement which operates against the belt fabric, all of the belt length which is initially fed through must be pulled through in the opposite direction while maintaining the released position of the buckle before the passenger can be removed. Under the adverse conditions encountered as an aftermath of an accident, this procedure is likely to become a time-consuming and a very difficult operation.

This invention is arranged in such a manner that release of the buckle through a control lever permits the buckle components to be disengaged directly by the tension of the belt without requiring any maneuvering of the buckle components themselves. Similarly, it is possible to engage a buckle embodying this invention by a straight shove-in operation that seems to involve a very natural movement of the hand. Engagement in this manner may be effected without operation of the lock-control lever. These construction features have been provided for in this invention in such form that the device can be made of blanked and formed sheet metal components, resulting in a minimum of weight and cost. The weight factor itself is important when it is considered that people have a tendency to object to the presence of heavy objects in their lap for long periods of time. Anything tending to increase the discomfort resulting from the use of such equipment will similarly tend to reduce the use of it, and will correspondingly reduce the safety factor made available by the installation of the equipment in the vehicle.

The several features of this invention will be analyzed in detail through a discussion of the particular embodiments illustrated in the accompanying drawings. In the drawings, Figure 1 presents a perspective view of a preferred form of this invention, showing the buckle components in the fully coupled and locked condition.

Figure 2 presents a section through the central portion of the assembly shown in Figure 1, on a plane generally parallel to the direction of tension of the belt.

Figure 3 is a section taken on the plane 3—3 of Figure 2.

Figure 4 shows an intermediate position during the release of the device.

Figure 5 shows a modified form of the invention.

Figure 6 illustrates an intermediate position during the coupling procedure.

Figure 7 illustrates a modified form of one of the buckle components.

Referring to Figure 1, the coupling member generally indicated at 10 has a slot 11 engaged by a belt section 12. The engaging portion 13 of the coupling member 10 is provided with an aperture 14 which cooperates with the formed abutment portion 15 extending laterally from the base 16 of the coupling member generally indicated at 17.

The abutment portion 15 provides a locking surface 18 which is disposed to form an obtuse exterior angle with the upper surface of the base portion 16, and it is preferable that this angle is between 100 and 135 degrees. As the angle opproaches 90 degrees, the coefficient of friction existing between the locking surface 18 and the mating locking surface 19 of the aperture 14 render it necessary to apply a separating force to disengage the components after the cams 20 and 20a have been rotated to full release position in the direction of the arrow 21 in Figure 4. On the other hand, as the angle of the locking surface 18 with respect to the base portion 16 exceeds 135 degrees, a very substantial component of force is established (resulting from belt tension) which urges the buckle components out of engagement. Such a tendency is opposed by the cams 20 and 20a positioned by the shaft 22, which is supported by the brackets 23 and 24 formed integrally with the base portion 16. However, as the belt tension increases, and as the angle of the locking surface with respect to the base is established at a greater and greater amount, the shaft 22 becomes overloaded to the point where it is necessary to use excessively large diameters to sustain the loading. It is desirable to establish the angular relationship of the locking surface 18 with respect to the base portion at that point where release of the cams 20 and 20a will result in immediate disengagement of the buckle components 10 and 17, and yet permit the cams 20 and 20a to maintain the engagement of the components without involving a substantial loading on the shaft 22.

The opposite end of the abutment 15 from the locking surface 18 is formed as the slanted surface 25. During the forced, or shove-in, engagement of the buckle components 10 and 17 as shown in Figure 6, the forward edge 26 of the coupling member 10 moves upwardly along the slanted surface 25 as the pressure of engagement against the cams 20 and 20a causes the rotation of the lock member to the point where the full engagement of the coupling members is permitted.

The locking member generally indicated at 27 not only includes the cams 20 and 20a, but also the operating handle or lever 28; and the release of the buckle components must necessarily involve the operation of the lever 28 in the direction of the arrow 21 (as indicated in Figure 4) a sufficient amount to move the cams 20 and 20a in a counterclockwise direction enough to permit the escape of the surface 19 from the locking surface 18. It should be noted, incidentally, that the locking surface 19 on the engaging portion 13 is preferably shaped to conform to the angle of the locking surface 18 in order to minimize the concentration of force at that point to prevent excessive wear. It is possible to provide the aperture 14 with such measurements (as indicated in the preferred form of the drawings) such that it will only be engageable with the abutment 15 in one position. In the modification illustrated in Figures 1 through 4, it is not possible to rotate the buckle components (about the axis of belt tension) 180 degrees, and engage the coupling members in this position. Under these circumstances, the lever 28 will not move downwardly into fully closed position because of the fact that the dimensions of the cut-out 14 will not permit the coupling member 10 to move down into surface engagement with the top of the base portion 16. The inclination of the surface 19 makes the distance across the aperture 14 greater on one side than on the other, and this condition results in making it possible to engage the coupling members only in one attitude. This arrangement serves to readily detect whether or not the belt is twisted. If the user of the buckle finds that the handle 28 does not assume its fully closed position, he becomes instantly aware that the belt is twisted and proceeds to re-engage it in the proper position.

Under circumstances in which it may not be desirable to have the buckle non-engageable in a particular attitude, the design of the aperture 14 may be revised as indicated in Figure 7. The coupling member 29 has a belt-receiving slot 30 similar to the slot 11 shown in Figure 1, and is similar in all respects to the locking member 10 except for the fact that the aperture 31 has its active surface formed with a double bevel shown at 32 and 33. This construction makes the position of the coupling member reversible with respect to the other coupling member, and will permit the full closure of the operating handle under both conditions.

The locking member 27 is biased to the fully closed or locked condition by the action of the helical spring 34 which surrounds the shaft 22. One end 35 of the spring 34 bears against the flange portion 36 of the locking member 27, and the opposite end 37 is received within the axially disposed slot 38 in the end of the shaft 22. The shaft 22 has a preferably hexagonal head 39 which is slotted as indicated at 40. The hexagonal head 39 is non-rotatably received in a similarly formed opening in the bracket 23, and the underside of the head 39 forms a shoulder which engages the surface of the cam 20a so that movement of the shaft to the left as shown in Figure 3 with respect to the came 20a is prevented. Since the cams 20 and 20a are both disposed between the brackets 23 and 24, this construction results in limitation of the movement of the shaft 22 to the left with respect to the entire assembly. After the installation of the shaft, accompanied by the sliding engagement of the spring 34, a C-shaper retaining washer 41 is snapped into assembled position in a groove in the shaft 22 to maintain the relationship of the components. Prior to installation of the retaining washer 41, the shaft is slightly displaced to the right as shown in Figure 3 a sufficient amount to disengage the hexagonal head 39 from its aperture in the bracket 23, and the shaft is then rotated a sufficient amount to establish the desired original tension of the spring 34. On obtaining this condition, the shaft may then be restored to the position indicated in Figure 3, and the retaining washer 41 inserted to complete the assembly.

Figure 5 illustrates a modified form of the invention, the difference between this modification and that illustrated in the previously-described figures being in the fact that the abutment portion 42 is formed as a part of the coupling member 43 rather than being on the coupling member 44 which contains the locking lever 28. Except for this reversal of position, the other features of construction of the two modifications are substantially identical.

As a result of the construction outlined above, tension between the belt section 45, which engages in slot 46 in the coupling member 17, and the belt section 12 is established along an axis parallel to the plane of the surface of the base 16. It is preferable that the apertures in the brackets 23 and 24 which receive the shaft 22 be established in a very close tolerance with respect to the surface of the base portion 16 against which the opposite coupling member rests to assure that the minimum amount of lost motion takes place while the buckle is in the locked position. To achieve the maximum degree of tolerance control it is the best practice to establish the position of these apertures receiving the shaft 22 after the brackets 23 and 24 have been bent into the illustrated position. If they are punched "in the flat" the resulting accumulation of tolerance resulting from the bending operation tends to expand the overall differences in position and produce a feeling of sloppiness in the engaged buckle.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A safety-belt buckle, comprising: a first coupling member, said first coupling member being in the form of a substantially flat plate having a belt-receiving portion and an engaging portion, said engaging portion having an aperture therein; and a second coupling member, said second coupling member having a belt-receiving portion and a substantially flat base portion provided with an abutment member extending transversely with respect thereto for cooperation with said aperture, said abutment member having a locking surface on the side of said abutment member adjacent said second coupling member belt-receiving portion, and inclined with respect to said base portion to form an exterior angle of between one hundred and one hundred thirty-five degrees, said abutment member also having an inclined surface on the side opposite from said locking surface, and forming an obtuse exterior angle with said base portion, said first coupling member aperture having closely-fitting relationship with said abutment member and having the side of said aperture most remote from said first member belt-receiving portion normally inclined to register with said locking surface on engagement of said coupling members, said second coupling member also having spaced brackets extending from said base portion on the same side thereof as said abutment member and having aligned holes and a shaft engaging said holes, said shaft having a head non-rotatively engaging one of said brackets and said shaft having an axial slot in the opposite end of said shaft from said head, said second coupling member also having a locking lever provided with cam portions rotatably mounted on said shaft and disposed between said brackets and on opposite sides of said abutment member, said cam portions being disposed to normally maintain the engagement of said first coupling member engaging portion with said abutment member, and being rotatable to a position providing for disengagement thereof, said locking lever being rotatable to locked position with said coupling members connected only with said coupling members in normal relative position, said second coupling member also having a helical spring surrounding said shaft and urging said lock lever to locking position, said spring having one end thereof engaging said shaft slot, and the opposite end engaging said lock lever, said second coupling member also having detachable retaining means limiting the axial movement of said shaft in head-first direction, the head of said shaft forming a shoulder limiting the movement of said shaft in the opposite direction by engagement with the adjacent cam portion of said lock lever.

2. A safety-belt buckle, comprising: a first coupling member, being in the form of a substantially flat plate, said first coupling member having a belt-receiving portion and an engaging portion, said engaging portion having an aperture therein; and a second coupling member, said second coupling member having a belt-receiving portion and a base portion provided with abutment means extending transversely with respect thereto for cooperation with said aperture, said abutment means having a locking surface on the side of said abutment means adjacent said second coupling member belt-receiving portion inclined with respect to said base portion to form an exterior angle of between one hundred and one hundred eighty degrees, said abutment means also having an inclined surface on the side opposite from said locking surface, and forming an obtuse exterior angle with said base portion, said first coupling member aperture receiving said abutment means, said second coupling member also having spaced brackets extending from said base portion on the same side thereof as said abutment means and having aligned holes and a shaft engaging said holes, said second coupling member also having a lock lever provided with cam portions mounted on said shaft rotatably with respect to said second coupling member and disposed between said brackets and to the side of said abutment means, said cam portions being disposed to normally maintain the engagement of said first coupling member engaging portion with said abutment means, and being rotatable to a position providing for disengagement thereof; and biasing means urging said lock lever to locking position.

References Cited in the file of this patent

UNITED STATES PATENTS

| | | |
|---|---|---|
| 49,061 | Adams | Aug. 1, 1865 |
| 165,239 | Kinn | July 6, 1875 |
| 389,960 | Frantzen | Sept. 25, 1888 |
| 401,880 | Frantzen | Apr. 23, 1889 |
| 643,431 | Washburne | Feb. 13, 1900 |
| 854,196 | Brown | May 21, 1907 |
| 2,458,810 | Varney et al. | Jan. 11, 1949 |
| 2,591,009 | Riche | Apr. 1, 1952 |
| 2,710,999 | Davis | June 21, 1955 |

FOREIGN PATENTS

| | | |
|---|---|---|
| 729,523 | Germany | Dec. 17, 1942 |
| 868,814 | Germany | Feb. 26, 1953 |